(12) United States Patent
Richards

(10) Patent No.: US 7,394,980 B1
(45) Date of Patent: Jul. 1, 2008

(54) SYSTEMS AND METHODS FOR TESTING A CIRCUIT IN A COMMUNICATION NETWORK

(75) Inventor: Douglas Lew Richards, Stilwell, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 600 days.

(21) Appl. No.: 10/279,676

(22) Filed: Oct. 24, 2002

Related U.S. Application Data

(63) Continuation-in-part of application No. 09/758,496, filed on Jan. 11, 2001, now Pat. No. 6,778,778, and a continuation-in-part of application No. 09/797,390, filed on Mar. 1, 2001.

(51) Int. Cl.
*H04B 10/08* (2006.01)
(52) U.S. Cl. ............................... 398/16; 398/22; 398/33
(58) Field of Classification Search ......... 398/128–172, 398/9–38
See application file for complete search history.

(56) References Cited

U.S. PATENT DOCUMENTS

| | | | | |
|---|---|---|---|---|
| 4,670,898 A | * | 6/1987 | Pierce et al. .................. | 379/22 |
| 5,077,729 A | | 12/1991 | Wong | |
| 5,367,394 A | | 11/1994 | Chuter et al. | |
| 5,416,623 A | | 5/1995 | Dawson et al. | |
| 5,969,833 A | * | 10/1999 | Jensen .......................... | 398/34 |
| 6,075,634 A | * | 6/2000 | Casper et al. ................ | 398/139 |
| 6,233,073 B1 | * | 5/2001 | Bowers et al. ................ | 398/16 |
| 6,301,336 B1 | | 10/2001 | Branton, Jr. et al. | |
| 6,317,535 B1 | | 11/2001 | Jennings et al. | |
| 6,335,810 B1 | | 1/2002 | Uehara | |
| 6,735,392 B1 | * | 5/2004 | Elahmadi et al. ............. | 398/7 |
| 6,744,760 B1 | * | 6/2004 | Solheim ...................... | 370/366 |
| 6,778,778 B1 | | 8/2004 | Richards et al. | |
| 6,990,294 B2 | * | 1/2006 | Ikoma et al. .................. | 398/16 |
| 7,181,138 B1 | * | 2/2007 | Gerstel et al. ................. | 398/33 |
| 2002/0097460 A1 | | 7/2002 | Ikoma et al. | |
| 2003/0035615 A1 | * | 2/2003 | Foltzer ........................ | 385/24 |

FOREIGN PATENT DOCUMENTS

| | | |
|---|---|---|
| EP | 1 096 705 A2 | 5/2001 |
| WO | WO 98/16027 | 4/1998 |

* cited by examiner

*Primary Examiner*—Dzung Tran

(57) ABSTRACT

A channel transponder tests a circuit in a communication network. The channel transponder includes short reach receiver circuitry, long reach transmitter circuitry, long reach receiver circuitry, generator circuitry, short reach transmitter circuitry, and a connector. The short reach receiver circuitry receives a first short reach signal. The long reach transmitter circuitry transmits a first long reach signal based on the first short reach signal. The long reach receiver circuitry receives a second long reach signal. The generator circuitry generates a test signal. The short reach transmitter circuitry transmits a second short reach signal based on the second long reach signal and transmits the test signal from the generator circuitry to the circuit wherein the test signal is monitored over the circuit to determine performance of the circuit. The connector connects the generator circuitry to the short reach transmitter circuitry.

16 Claims, 8 Drawing Sheets

SYSTEMS AND METHODS FOR TESTING A CIRCUIT IN A COMMUNICATION NETWORK

RELATED APPLICATIONS

This application is a continuation-in-part of U.S. patent application Ser. No. 09/758,496 entitled "Arrangement and Method for Testing Fiber Optic Telecommunications Circuits Over Dense Wavelength Division Multiplexing (DWDM)," filed on Jan. 11, 2001 now U.S. Pat. No. 6,778,778 and further is a continuation-in-part of U.S. patent application Ser. No. 09/797,390 entitled "Remote Control Device Adapted to a System and Method for Testing Fiber Optic Telecommunication Circuits Over Dense Wavelength Division Multiplexing (DWDM)," filed on Mar. 1, 2001, which are hereby incorporated by reference.

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of telecommunications, and in particular, to methods and systems for testing a circuit in a communication network.

2. Description of the Prior Art

As is known, telecommunication service providers have created cross country or ultra long haul networks. These networks are driven, in part, by the nature of Internet and data traffic and by ever expansive enterprise networks. Voice traffic, on the other hand, is characterized as more regional and served principally by metropolitan and regional networks. Network planners visually depict these two developing traffic patterns as network overlays, served by different transmission equipment. Internet and data traffic over these networks has been increasing at a significant rate and currently dominates voice traffic for many long distance service providers.

Telecommunication service providers continually look toward new technologies leading to greater network carrying capacity, or bandwidth, and increasing transmission distances, which are the length separations between system transmitting and receiving terminals. DWDM is the favored optical technology for increasing bandwidth on an optical fiber. DWDM operates by multiplexing and transmitting a number of signals, i.e. OC-48/STM-16, OC-192/STM-64, or OC-768/STM-256, simultaneously at different wavelengths on the same optical fiber. As a result, a single optical fiber provides a number of virtual optical fibers by carrying a number of simultaneous signals. This permits greater network traffic through increased bandwidth.

The most aggressive service providers have deployed 40 channel DWDM systems with transmission distances limited to around 500 km before requiring Optical-Electrical-Optical (O-E-O) regeneration of the optical bit streams. Thus, DWDM systems are connected back-to-back for cross country connectivity. In order to overcome these limitations, DWDM system manufacturers are presently offering to at least double both channel count and transmission distance. More elaborate technologies will lead to greater length (x) bandwidth products and true ultra-long haul systems.

Along with the interests aimed at increasing both transmission length and bandwidth, a greater importance is being placed on developing more efficient network management tools and test equipment. Service providers have been instrumental in driving this development and embedding performance measures and diagnostic tools into their system elements. Circuit tests that are performed by field technicians include, for example, tests for optical power levels, loss of signal modulation, and code violations.

Currently, field technicians cannot trouble-shoot an entire cross country DWDM circuit without tremendous group coordination. Each cross country DWDM circuit comprises a number of sub-circuits that must be administered by a local field technician during a test. For example, a circuit from State 1, which is located in one region of a country, to State 4, which is located in a distant region of the country, might comprise multiple, sequential sub-circuits from State 1 to State 2, State 2 to State 3, and State 3 to State 4. During a test, a local field technician for a sub-circuit can only monitor and trouble-shoot their individual sub-circuit. Therefore, to obtain information relating to another sub-circuit, a field technician must either communicate with another field technician who is monitoring the other sub-circuit or rely on personnel in a Network Operation Center (NOC) that can survey the entire circuit.

Less reliance on the NOC is desired. It is impractical for a NOC to be heavily involved in turn-up testing or prolonged maintenance tasks. A NOC should rather be focused on in-service traffic management.

Currently, field technicians test circuits with a device that has both a transmitter for transmitting a test-drive signal on a circuit and a receiver for receiving the test-drive signal after it is returned from a far end of the circuit. The transmitter/receiver couples to a near end of the circuit at, for example, a fiber access panel. A variety of tests are routinely performed via the transmitter/receiver unit that include tests for optical power levels, loss of signal modulation, and code violations. Much of the time of circuit testing is spent, based on actual field experience, in performing continuity tests on turn-up testing before final Bit Error Ratio (BER) testing. This may be easily handled by keying in a number of B1 byte errors and confirming counters correctly incremented downstream; some technicians may use simple on/off laser control and look for Loss of Signal (LOS) and Loss of Frame (LOF) at downstream system ingress and egress points. Lacking continuity may require an installations technician to be dispatched to trouble-shoot and complete a cross-connect.

Each of these tests requires careful attention to detail. Since the transmitter/receiver and the fiber access panel are typically of an open-chassis design, they provide a potential electrical shock hazard to the field technician, who manipulates pushbutton operators located directly on the transmitter/receiver. Also, the field technician is limited to working proximate to the transmitter/receiver in order to operate the device. This disadvantageously limits the field technician's zone of movement during testing.

It is therefore desirable to empower field operations by providing the tools and test equipment to efficiently manage turn-up and maintenance requirements.

SUMMARY OF THE INVENTION

The inventions solve the above problems by using a channel transponder that tests a circuit in a communication network. The channel transponder includes short reach receiver circuitry, long reach transmitter circuitry, long reach receiver circuitry, generator circuitry, short reach transmitter circuitry, and a connector. The short reach receiver circuitry receives a first short reach signal. The long reach transmitter circuitry transmits a first long reach signal based on the first short reach signal. The long reach receiver circuitry receives a second long reach signal. The generator circuitry generates a test signal. The short reach transmitter circuitry transmits a second short reach signal based on the second long reach signal and transmits the test signal from the generator circuitry to the circuit wherein the test signal is monitored over the circuit to determine performance of the circuit. The connector connects the generator circuitry to the short reach transmitter circuitry.

In some embodiments, the channel transponder includes receiver circuitry that receives the test signal from the circuit and monitor circuitry that monitors the test signal from the circuit to determine the performance of the circuit. In some embodiments, the test signal comprises a pseudo random bit sequence. In other embodiments, the test signal comprises an alarm indication signal. In some embodiments, the test signal comprises a test pattern. In some embodiments, the test signal comprises an error. In some embodiments, the channel transponder is for spare channels.

The channel transponder advantageously eliminates a separate, external transmitter that tests for continuity and/or Bit Error Rate (BER). Thus, the expensive costs and space of the separate transmitter are eliminated, which makes testing the circuit in a communication network cheaper and more efficient. Additionally, less equipment translates into less maintenance time and costs. The possibility of electrical shocks from the transmitter as discussed above is eliminated as well.

BRIEF DESCRIPTION OF THE DRAWINGS

The same reference number represents the same element on all drawings.

DETAILED DESCRIPTION OF THE INVENTION

Figure 1:
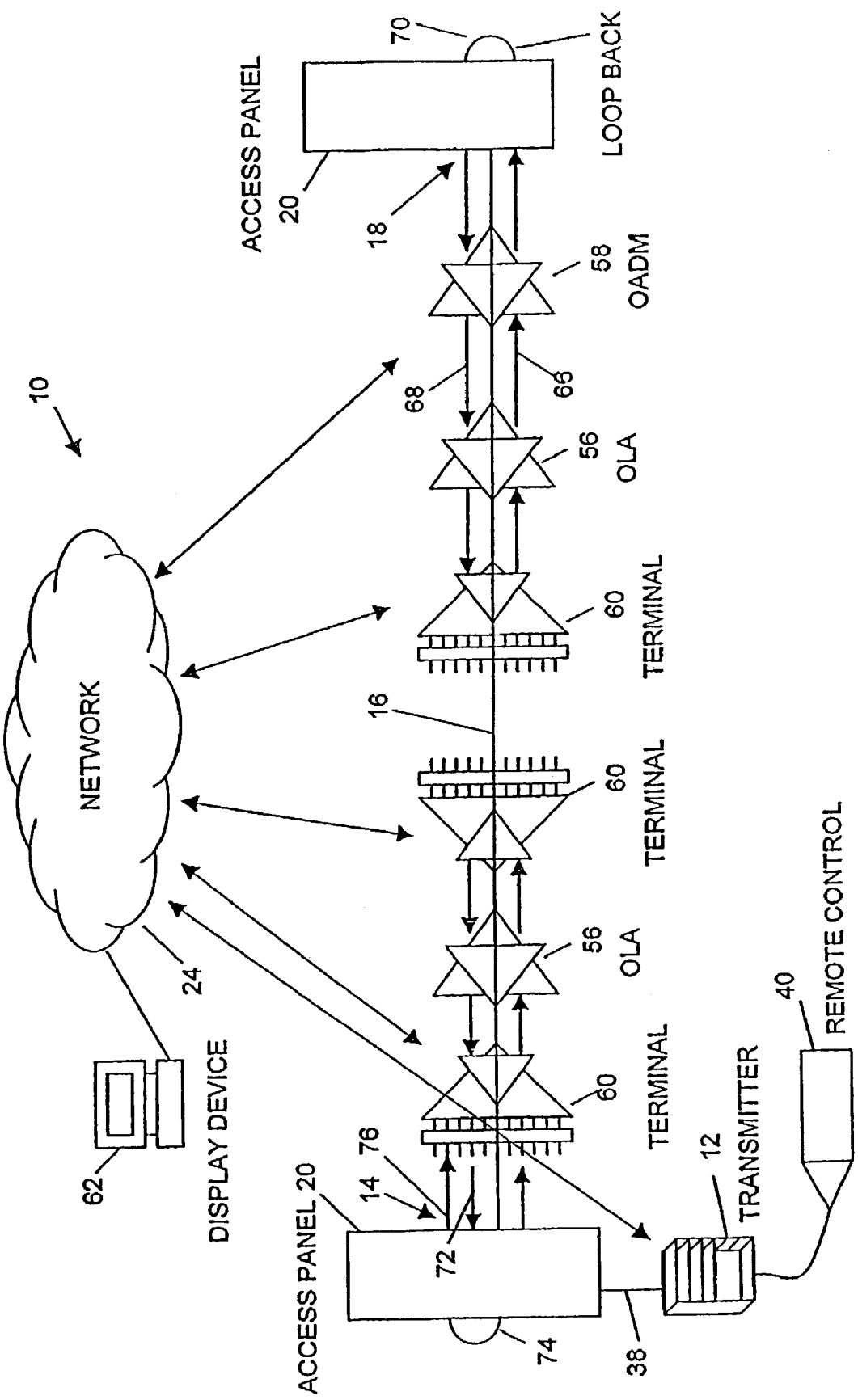
FIG. 1 is schematic block diagram of a system for testing a DWDM circuit constructed and operated in accordance with the present invention.

In FIG. 1, there is illustrated a system 10 for testing a circuit over DWDM that embodies principles of the present invention. As illustrated, a transmitter 12 is coupled to a near end 14 of a DWDM circuit 16 at a fiber access panel 20 using a fiber optic transmit cable or patch cord 38, as described below. The transmitter 12 is shown in FIG. 1 as a plug-in module. The circuit 16 can comprise a single circuit between, for example, two closely located cities. Alternatively, the circuit 16 can comprise, for example, a multi-point cross country circuit between distant cities with a number of contiguous sub-circuits spanning intermediate cities.

The circuit 16 typically comprises a number of virtual optical fibers, or channels, for transmission, including a number of critical spare channels. The channels terminate at the near end 14 and far end 18 of the circuit 16 at fiber access panels 20. The channels of any intermediate sub-circuits may also terminate at fiber access panels 20. In the present discussion, fiber access panels 20 cross-connect network elements such as add-drop multiplexers, IP routers, or ATM switches, to individual channels on a DWDM system. In some embodiments, the individual channels may also be cross-connected.

Figure 2:
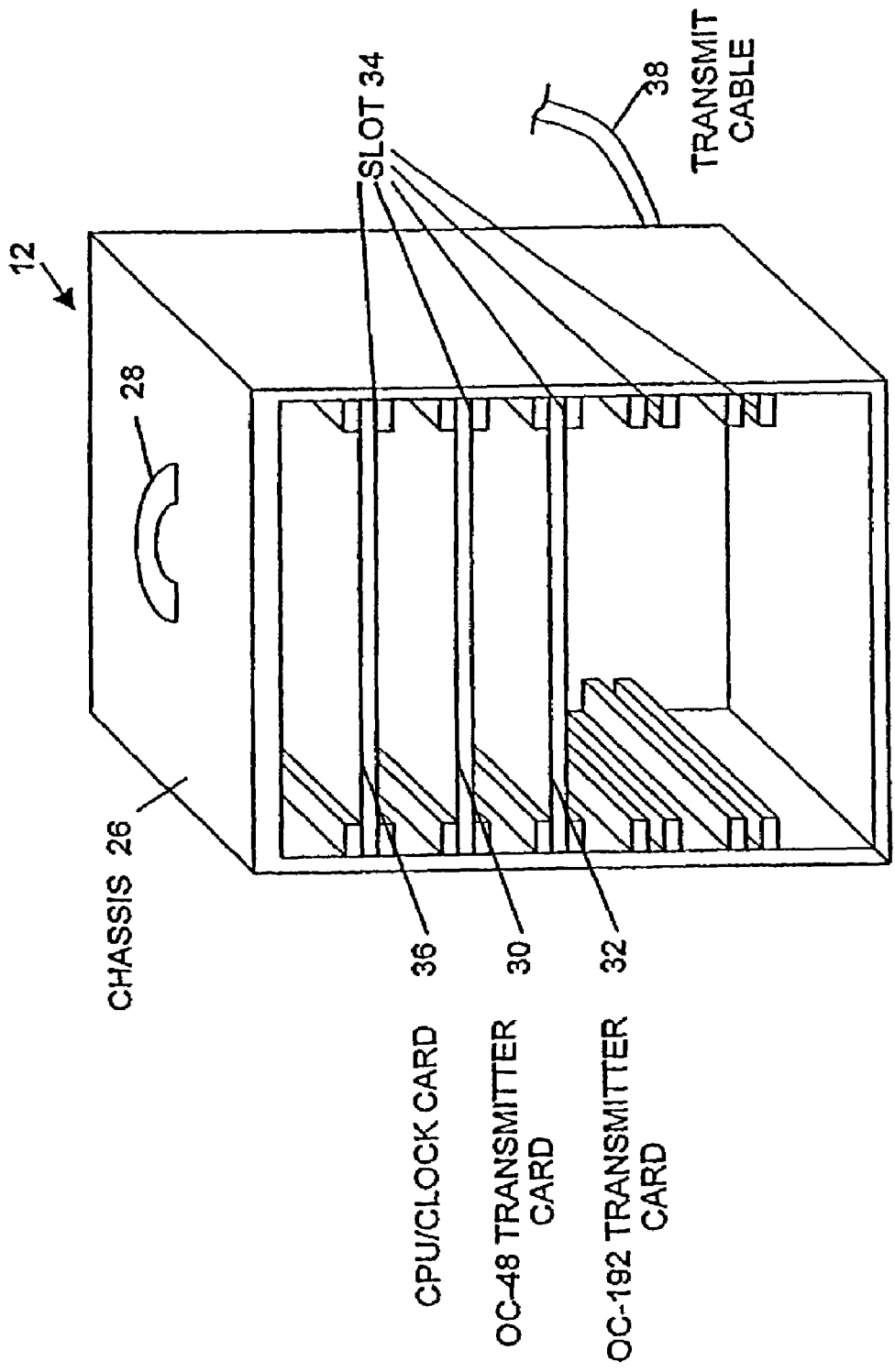
FIG. 2 is a plan view of a transmitter constructed and operated in accordance with the present invention.

Circuits are typically tested with a known device that has both a transmitter for transmitting a test-drive signal on a circuit and a receiver for receiving the test-drive signal after it is returned from a far end of the circuit. As disclosed in U.S. patent application Ser. No. 09/758,496, circuits can also be tested using a "bare bones" transmitter in unison with a network for monitoring performance of the circuit. Referring to FIG. 2, the "bare bones" transmitter 12 has a rack mounted chassis 26. The chassis 26 is portable and can be provided with a carrying handle 28 and/or mounted in a cross-connect cabinet or equipment rack.

One- or more modular transmitter cards 30, 32 are mounted in slots 34 of the chassis 26. Each transmitter card 30,32 produces a test-drive signal. In one embodiment, at least one of the transmitter cards 30 is an Optical Carrier-48 (OC-48 or STM-16), such as Synchronous Transport Signal-48c (STS-48c), transmitter. Additional transmitter cards can also be provided, such as an OC-192/STM-64 (STS-192c) transmitter card 32 and/or a 40 Gigabit or higher transmitter card. Each transmitter card 30, 32 includes a laser transmit output port (not shown) for outputting the test drive signal. Timing and control of the transmitter cards 30, 32 is performed by a CPU/clock card 36, which is mounted in one of the slots 34. Additional slots 34 can be provided in the chassis 26 to accommodate additional cards, such as transmitter cards, receiver cards, or 4:1 passive splitter cards.

The transmitter cards 30, 32 are optically coupled to the fiber access panel 20 via a fiber optic transmit cable 38. The transmitter card 30, 32 optical interface to the transmit cable 38 complies with GR-253-CORE short reach specifications, SONET/SDH ITU-T standards, or Very Short Reach standards.

The transmitter 12 is designed to meet daily field requirements. A field technician can control the transmitter 12 via actuators (not shown) on the various transmitter cards 30, 32. A laser power actuator (not shown) toggles power to the laser (not shown) of the selected transmitter card 30, 32 and starts/stops the test-drive signal transmission. The transmitter cards 30, 32 also have an error insert actuator (not shown), which allows a field technician to inject a single error, such as a B1 byte error, into the test drive signal during BER testing. Thus, the field operator must stand proximate to the transmitter 12 during testing to operate the actuators located on the transmitter 12.

The present remote control device 40 overcomes this known disadvantage by providing a device having a remote connection to the transmitter 12. Therefore, the field technician can use the remote control device 40 to operate the transmitter 12 from a remote location.

Figure 3:
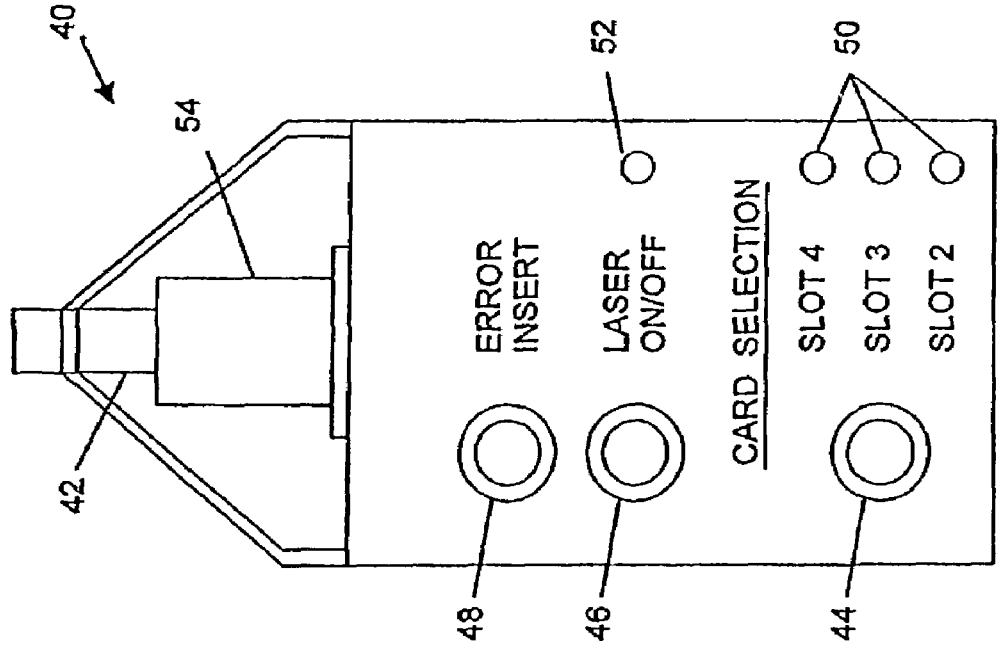
FIG. 3 is a plan view of a remote control device constructed and operated in accordance with the present invention.

Referring to FIG. 3, in an embodiment, a field operator controls the transmitter 12 via a remote control device 40, which is connected to the transmitter 12 via a control cable 42. The remote control device 40 is provided with a number of actuators 44, 46~48 for controlling the various functions of the transmitter 12. A transmitter card select button 44 selects one of the transmitter cards 30, 32 for operation. One of the transmission card indicators 50 illuminates to signal to the field operator which transmitter card 30, 32 is selected. A laser power button 46 toggles power to the laser (not shown) of the selected transmitter card 30, 32 and starts/stops the test-drive signal transmission. A laser indicator 52 illuminates when a laser (not shown) is powered on. The remote control device 40 also has an error insert button 48, which allows an operator to inject a single B1 byte error into the test-drive signal during bit-error-rate testing.

In another embodiment, the transmitter card select button 44 and the laser power button 46 can be replaced with a separate laser power button for each transmitter card 30, 32. Accordingly, if the transmitter 12 has an OC-48 transmitter card 30 and an OC-192 transmitter card 32, then the remote control device 40 can be provided with an OC-48 laser power button and an OC-192 laser power button.

In the illustrated embodiment, the control cable 42 is removeably connected to the remote control unit 40 via a cable connector 54. Communication between the remote control unit 40 and the transmitter 12 is via, for example, an RS-232 or Ethernet controlled cable connection. In other embodiments, the transmitter 12 is controlled over an enterprise network.

Alternatively, the remote control unit 40 can be connected to the transmitter via, for example, a radio frequency transmission connection, a radio-less MMDF transmission connection, a 900 mHz transmission connection, an infra-red transmission connection, a dial-up connection, an Internet connection, a local area network connection, or any type of wireless connection. Therefore, once the transmitter 12 is coupled to the TODF 20, a field operator can control the transmitter 12 from any distance based on the type of remote connection.

In addition to the embodiment shown in FIG. 3, the remote control device 40 can have other configurations which are suitable for actuating the various transmitter 12 functions. For example, the remote control device 40 can be a Palm-type device, personal digital assistant or computer. In these embodiments, the pushbutton actuators 44, 46, 48 can be substituted with keyboard, touch pad or touch screen actuators. Display device images can indicate status of, for example, laser power and transmission card selection. The remote connection between the remote control device 40 of one of these embodiments and the transmitter 12 can be, for example, any of the above-identified connection types.

The test-drive signal need only conform to Short Reach (SR) or Very Short Reach (VSR) SONET/SDH specifications, amounting to a savings over Long Reach (LR) specifications. Alternatively, the test drive signal can conform to other specifications, such as LR SONET/SDH specifications. The term "short reach" refers to meeting Short Reach or Very Short Reach SONET/SDH specifications, while the term "long reach" refers to meeting Long-Reach SONET/SDH specifications. In an embodiment, the test drive signal further comprises a test pattern of "1010 . . . ," for full bandwidth exercise, and a $2^{23}-1$ Pseudo Random Bit Sequence (PRBS) at OC-48 (STS-48c), which is a common stress pattern that simulates live traffic on the circuit 16. A $2^{31}-1$ PRBS is preferred at OC-192 (STS192c). In an embodiment, the remote control device 40 is provided with means for selecting test patterns.

Preventive maintenance and trouble-shooting are ongoing activities for a field technician. They require testing of the entire circuit 16 to ensure that no problem areas exist. Thus, it is critical that a field technician has the ability to monitor the performance of the circuit 16 at all sub-circuit ingress and egress points. As stated above, testing of a cross country circuit currently involves the coordination of resources along the circuit. Each field operator can only monitor their individual sub-circuit. Therefore, to obtain information relating to another sub-circuit, a field operator must either communicate with another field operator who is monitoring the other sub-circuit or communicate with a NOC that can survey the entire circuit. During circuit testing, a variety of tests are routinely performed that include tests for optical power levels, loss of signal modulation, and code violations. Much of the time of circuit testing is spent, based on actual field experience, in performing continuity tests on turn-up testing before final Bit Error Ratio (BER) testing. This may be easily handled by keying in a number of B1 byte errors and confirming counters correctly incremented downstream; some technicians may use simple on/off laser control and look for Loss of Signal (LOS) and Loss of Frame (LOF) at downstream system ingress and egress points. Lacking continuity may require an installations technician to be dispatched to trouble-shoot and complete a cross-connect.

Each of these tasks is labor intensive, as they require the coordination of operating the transmitter, communicating with the NOC, and monitoring the performance of the circuit. Thus, the field technician is currently burdened by having to utilize a number of different testing and communication devices that may not be proximately located to one another. Accordingly, there arise dangerous conditions and the potential for field technician error.

These known disadvantages are overcome by providing a remote control device 40 adapted to an arrangement for testing a circuit that enables a field technician to control the transmitter 12 via a remote connection. Thus, a field technician can use the remote control device 40 to operate a transmitter 40 during testing from any location that permits a remote connection to the transmitter 12. For example, the field technician can monitor performance of the circuit via the display device 62, which is located in a first room, and simultaneously use the remote control device 40 to remotely control the transmitter 12, which is located in a second room.

The field technician initiates a circuit 16 test by manually coupling the transmitter 12 to the fiber access panel 20 if the transmitter 12 is not already coupled thereto. The field operator selects a transmitter card 30, 32 by pressing the transmitter card select button 44 on the remote control device 40. The corresponding transmission card indicator 50 will illuminate on the remote control device 40. The field operator then activates the test-drive signal by pressing the laser power actuator 46. The laser indicator 52 will illuminate on the remote control device 40. Accordingly, the test-drive signal, which preferably comprises the OC-48/STM-16 or OC-192/STM-64 signal with a desired default test pattern e.g. a $2^{23}-1$ PRBS for OC-48/STM-16 or a $2^{31}-1$ for OC-192/STM-64, is transmitted on the circuit 16. Other test patterns may be selected by remote control of the transmitter 12 settings via the remote control device 40. In other embodiments, the test patterns are selected by telneting over an enterprise network.

Through a display adapted to the transmitter 12 or through the display device 62 connected to the network 24, the field technician will monitor data collected from the various network elements 56, 58, 60 along the circuit 16. Both a transmission path 66 and a return path 68 of the test-data signal can be monitored at one time by providing a loop-back 70 at the far end 18 of the circuit 12. In order to monitor a final section 72 of the return path 68 from the near end system egress point to the fiber access panel 20, an output channel of the return path 68 can be patched to an input of another channel, such as a spare channel 76, through the use of a coupling 74. The loop-back 70 can either be a "hard" loop-back or a "soft" facility loop-back. The performance of the entire circuit, i.e. BER measurement, can be monitored at the spare channel system ingress point or at a spare channel transponder.

During BER testing, a field technician monitors the BER performance of the test drive signal at sub-circuit ingress and egress points 60 and 58. In order to simulate a B1 byte error, the field operator presses the error insert actuator 48 on the remote control device 40. This injects a single B1 byte error into the test-drive signal, which error can be monitored downstream at the network device 58 and 60. The field operator may zero a B1 byte counter through the display device 62. Further, other types of errors can be injected into the test-drive signal via the remote control device 40.

In an embodiment, the remote control device 40 is adapted to an arrangement or method wherein circuit 16 performance is monitored on a network 24, such as an OSS network. Any field technician who has access to the network 24 can view the performance of the entire circuit 16. Thus, a single field technician can simultaneously control the test-drive signal transmitter 12 and monitor, through the network 24, the performance of the entire circuit 16.

The network 24 comprises a communications network operating under, for example, an Ethernet communications protocol. Circuit 16 performance data is gathered from NEs, such as Optical Add-Drop Multiplexers (OADMs) 56, Optical Line Amplifiers (OLAs) 58, and terminals 60 for monitoring on the network 24. An intermediate DWDM management system (not shown) can be provided to interface directly to the NEs 56, 58, 60 for embedded performance monitoring and to communicate the performance data to the network 24.

A field technician can monitor the performance of the circuit 16 simply by accessing the network 24 and telneting to the NE's IP address, made available on a secure web site. This access is preferably done through a display device 62, such as a laptop computer or CID, that is coupled to the network 24 via, for example, an Ethernet or dial-up connection.

Thus, the geographical constraints and manpower problems associated with current circuit testing methods and devices are eliminated by providing an arrangement and method for monitoring performance of a circuit 16 from any location. A field technician can remotely access the network 24, telnet to a distant NE 56, 58, 60, and monitor the performance at any point on the cross country circuit 16. Further, the transmitter 12, which can be operated via the remote control device 40, can also be connected to the network 24 for remote control by the field technician. Therefore, a single field technician can both operate the transmitter 12 via the remote control device 40 and monitor the entire circuit 16 from a display device 62 at a remote location.

It is preferable that field access to the DWDM management system via the network 24 be restricted to "read only" user privileges except for allowing B1 counters, or the like, to be reset to zero. Full access to the DWDM management system provides on/off control of all system vitals. Only the local field technician or NOC personnel have full administrative privileges. NE IP addresses should be posted on a secure web site.

One drawback to the transmitter 12 is the total cost of the transmitter 12. The transmitter 12 has many components such as the chassis 26, the transmitter card 30, 32, CPU/clock card 36, receiver card, and splitter cards. Some of these components can be expensive especially for higher speed optical components such as an OC-192/STM-64 (STS-192c) transmitter card 32 and a 40 Gigabit transmitter card. These higher speed optical components become very expensive as delivery of OC-768/STM-256 is contemplated. In addition, external BER test equipment are expensive. Another drawback is the transmitter 12 occupies a certain amount of space. Unfortunately, there are duplicative devices and/or components in the communication network that have similar functions to the components within the transmitter 12 but are not utilized in testing circuits in the communication network.

FIGS. 4-7 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 4:
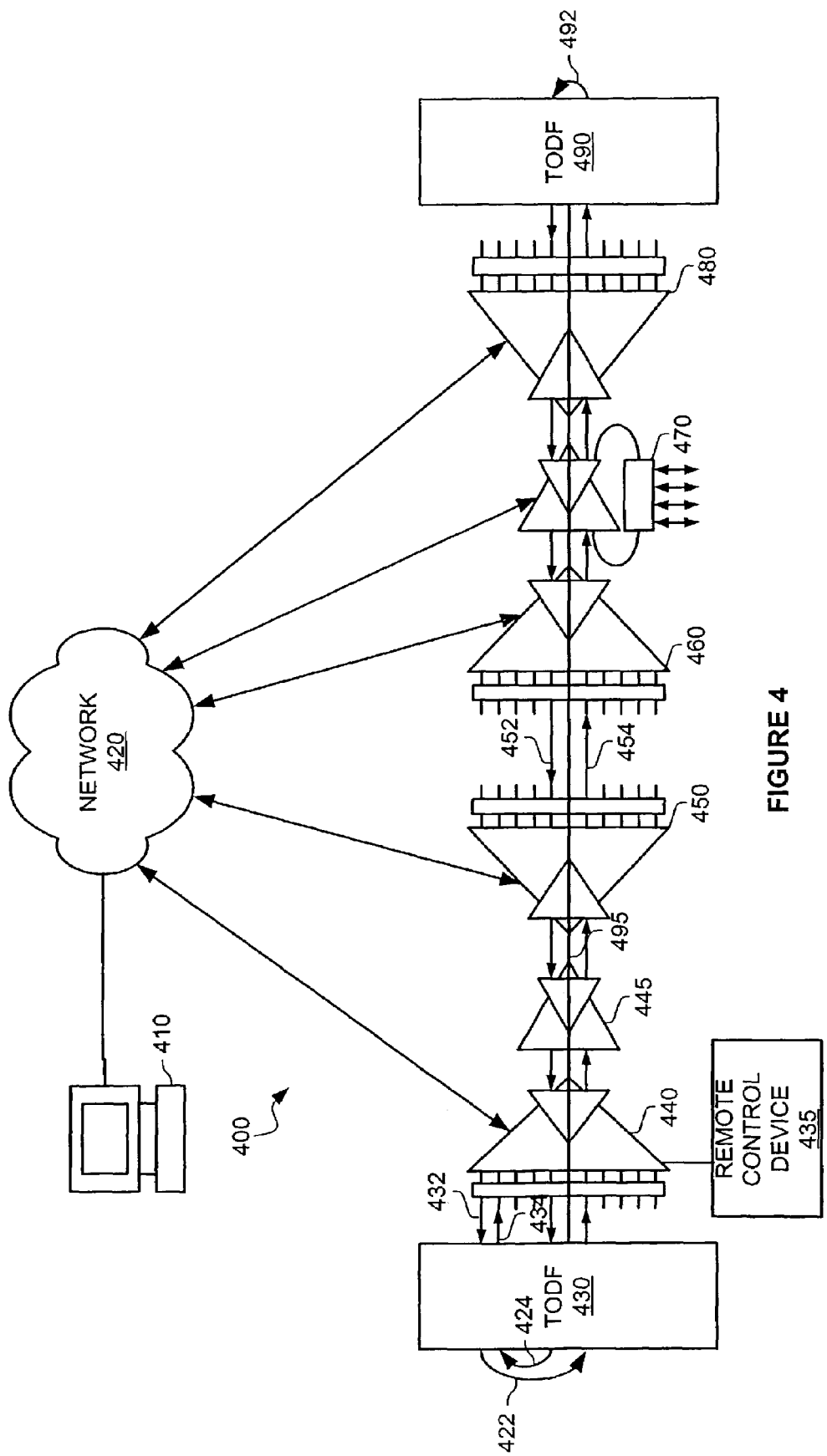
FIG. 4 is an illustration of a communication network in accordance with the present invention.

FIG. 4 depicts an illustration of a communication network 400 in an example of the invention. The communication network 400 comprises a display device 410, a network 420, a Transport Optical Distribution Frame (TODF) 430, a remote control device 435, a terminal 440, an optical line amplifier (OLA) 445, a terminal 450, a terminal 460, an optical adddrop multiplexer (OADM) 470, a terminal 480, and a TODF 490. The display device 410 is connected to the network 420. The network 420 is connected to the terminal 440, the terminal 450, the terminal 460, the OADM 470, and a terminal 480. A patch link 422 and a patch link 424 are connected to the TODF 430. A spare link 432 and a spare link 434 are also connected to TODF 430. The TODF 430 is connected to the terminal 440. The terminal 440 is connected to the OLA 445 and the remote control device 435. The OLA 445 is connected to the terminal 450. The terminal 450 is connected to the terminal 460. The terminal 460 is connected to the OADM 470. The OADM 470 is connected to the terminal 480. The terminal 480 is connected to the TODF 490. The TODF 490 is connected to a loop-back link 492.

FIG. 4 illustrates a communication network for testing a circuit over DWDM that embodies principles of the present invention. The circuit 495 is connected from the TODF 430 to the TODF 490 via the terminal 440, the OLA 445, the terminal 450, the terminal 460, the OADM 470, and the terminal 480. The circuit 495 can comprise a single circuit between, for example, two closely located cities. Alternatively, the circuit 495 can comprise, for example, a multi-point cross country circuit between distant cities with a number of contiguous sub-circuits spanning intermediate cities. The circuit 495 typically comprises a number of virtual optical fibers, or channels, for transmission, including a number of critical spare channels. The channels terminate at the near end TODF 430 and the far end TODF 490. In the present discussion, the TODF 430 and the TODF 490 cross-connect network elements such as add-drop multiplexers, IP routers, or ATM switches, to individual channels on a DWDM system. Both the initial test signal and the returning test signal propagate within the circuit 495. The initial test signal from the TODF 430 to the TODF 490 is shown as arrows 454. The returning test signal from the TODF 490 to the TODF 430. The display device 410 and the network 420 operate as described above for monitoring and displaying the performance of the circuit.

The terminal 440 contains a spare channel transponder and a channel transponder described below. The spare channel transponder is typically used as backup for channel transponders. The spare channel transponder modified according to the invention below eliminates the transmitter 12 of FIG. 1. The spare channel transponder can then generate and transmit the test signal onto the circuit. The spare channel transponder also receives the test signal after returning from the far end of the circuit. Final BER performance is judged at the near-end spare channel transponder.

In this embodiment, the remote control 435 is connected to the terminal 440. The remote control 435 operates as described above for controlling transmitter functions such as starting/stopping test signals, injecting errors, and selecting type of test signals. In this embodiment, the remote control 435 may transmit control instructions to various components within the spare channel transponder to start/stop test signals and to select the type of test signals. The transmitter selection as described above is replaced by a spare channel transponder test feature. When lit, the spare channel transponder test feature indicates an active test feature on that particular spare channel transponder. In addition, the laser on/off button now applies to that active test feature.

Figure 5:
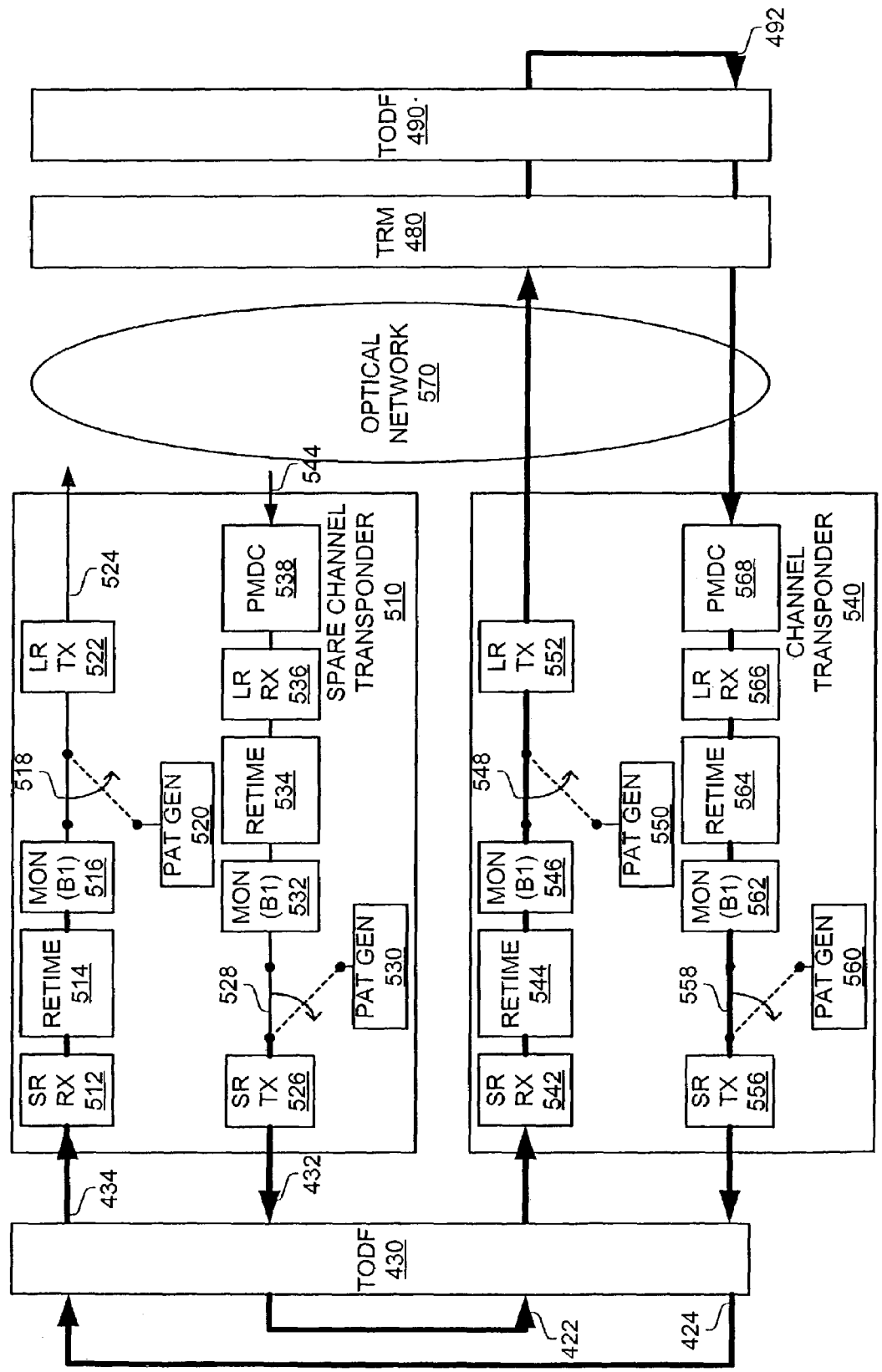
FIG. 5 is an illustration of a communication network with channel transponders in accordance with the present invention.

FIG. 5 depicts the communication network 400 in greater detail for the channel transponders and simplification and omission of other elements in the communication network 400 to focus on the operation of the channel transponders. The spare channel transponder and the channel transponder in FIG. 5 are located within the terminal 440. Only one channel transponder and one channel transponder are shown in FIG. 5 for the sake of simplicity. There may be numerous spare channel transponders and channel transponders within a terminal in other embodiments. FIG. 5 depicts an illustration of a communication network 500 with channel transponders in an example of the invention. The communication network 500 comprises the TODF 430, a spare channel transponder 510, a channel transponder 540, an optical network 570, the terminal 480, and the TODF 490.

The link 422, 424, 434, and 432 are connected to the TODF 430. The spare channel transponder 510 comprises a short reach receiver 512, a retime 514, a monitor 516 for B1 bytes, a switch 518, a pattern generator 520, a long reach transmitter 522, a short reach transmitter 526, a switch 528, a pattern generator 530, a monitor 532 for B1 bytes, a retime 534, a long reach receiver 536, and an optical polarization-mode dispersion compensator 538. The link 434 is connected to the short reach receiver 512. The short reach receiver 512 is connected to the retime 514. The retime 514 is connected to the monitor 516 for B1 bytes. The switch 518 is connected to the monitor 516 for B1 bytes, the pattern generator 520, and the long reach transmitter 522. The long reach transmitter 522 is connected to a link 524.

The link 432 is connected to the short reach transmitter 526. The switch 528 is connected to the short reach transmitter 526, the pattern generator 530, and the monitor 532 for B1 bytes. The monitor 532 for B1 bytes is connected to the retime 534. The retime 534 is connected to the long reach transmitter 536. The long reach receiver 536 is connected to the optical polarization-mode dispersion compensator 538. The optical polarization-mode dispersion compensator 538 is connected to a link 544. The link 432 and the link 434 are connected to the short reach client side interface. The link 524 and the link 544 are connected to the long reach DWDM side for transmission over long haul links. The optical network 570 represents the amplifier 445, the terminal 450, the terminal 460, and the OADM 470 of FIG. 4.

The channel transponder 540 comprises a short reach receiver 542, a retime 544, a monitor 546 for B1 bytes, a switch 548, a pattern generator 550, a long reach transmitter 552, a short reach receiver 556, a switch 558, a pattern generator 560, a monitor 562 for B1 bytes, a retime 564, a long reach transmitter 566, and an optical polarization-mode dispersion compensator 568. The short reach receiver 542 is connected to the retime 544 and the TODF 430. The retime 544 is connected to the monitor 546 for B1 bytes. The switch 548 is connected to the monitor 546 for B1 bytes, the pattern generator 550, and the long reach transmitter 552. The long reach transmitter 552 is connected to the terminal 480 via the optical network 570.

The short reach transmitter 556 is connected to the TODF 430. The switch 558 is connected to the short reach transmitter 556, the pattern generator 560, and the monitor 562 for B1 bytes. The monitor 562 for B1 bytes is connected to the retime 564. The retime 564 is connected to the long reach transmitter 566. The long reach receiver 566 is connected to the optical polarization-mode dispersion compensator 568. The optical polarization-mode dispersion compensator 568 is connected to the terminal 480 via the optical network 570.

In this embodiment, the components within the spare channel transponder 510 and the channel transponder 540 are application specific integrated chips/circuits. The short reach receivers 512 and 542 are conventional circuitry or device configured to receive short reach optical signals. The retimes 514, 534, 544, and 564 are conventional circuitry or devices configured to retime optical signals. The monitors 516, 532, 546, and 562 for B1 bytes are circuitry or devices configured to monitor for the B1 byte in the section overhead of a SONET/SDH frame. The B1 byte is allocated for section error monitoring. The switches 518, 528, 548, and 558 are conventional circuit switches configured to switch from one circuit to another.

The pattern generator 520, 530, 550, and 560 are circuitry or devices configured to generate test signals. In some embodiments, the test signal is a pseudo random bit sequence. In other embodiments, the test signal is an alarm indication signal. The pattern generator 530 and the switch 528 have been added to the spare channel transponder 510 to provide the ability to test circuits in the communication network 400 in accord with the present invention. The pattern generator 530 and the switch 528 are used to test the circuit beginning with the TODF 430. The TODF 430 is the recognized demarcation point where BER testing is performed. Thus, the testing of the circuit may include the last leg of cable connections and the client side interface to fully exercise or tax the client side interface. The tested path is shown in bold connections between the pattern generator 530, the switch 528, the short range transmitter 526, the link 432, the TODF 430, the link 422, the TODF 430, the short range receiver 542, the retime 544, the monitor 546 for B1 bytes, the switch 548, the long range transmitter 552, the optical network 570, the terminal 480, the TODF 490, the terminal 480, the optical network 570, the polarization-mode dispersion compensator 568, the long range receiver 566, the retime 564, the monitor 562 for B1 bytes, the switch 558, the short range transmitter 556, the TODF 430, the link 424, the TODF 430, the link 434, the short range receiver 512, the retime 514, and the monitor 516 for B1 bytes. The pattern generator 520 and the switch 518 do not provide this comprehensive testing because only the long reach DWDM side is tested, while the short-reach client side interface is ignored.

The long reach transmitters 522 and 552 are conventional circuitry or a conventional device configured to transmit long reach optical signals based on the wavelength translation of short reach optical signals from the short reach receiver. The optical polarization-mode dispersion compensators 538 and 568 are conventional circuitry or a conventional device configured to compensate for effects of polarization-mode dispersion. The long reach receivers 536 and 566 are conventional circuitry or a conventional device configured to receive long reach optical signals. The short reach transmitter 526 and 556 are conventional circuitry or a conventional device configured to transmit short reach optical signals based on wavelength translations of the long reach optical signals from the long reach receiver and transmit the test signal to the circuit.

In some embodiments, the spare channel transponder 510 handles security to allow control to certain users. In one example, a field technician would be given control to the spare channel transponder 510 and its test features, but not to the remaining "production" channel transponders. With this security, various personnel may be given different levels of administrative privileges.

Figure 6:
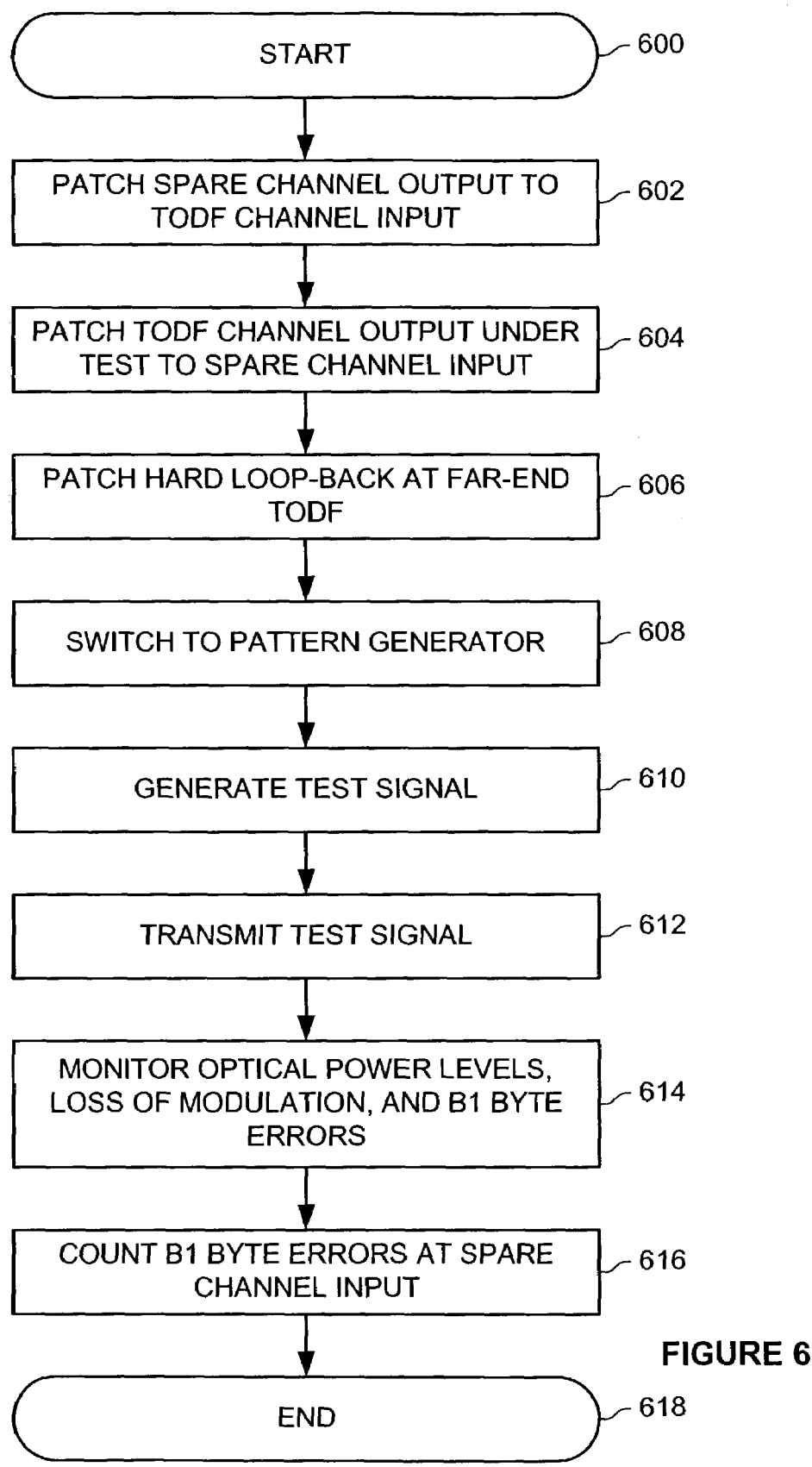
FIG. 6 is a flow chart for testing circuits in accordance with the present invention.

FIG. 6 is a flow chart for testing circuits in an example of the invention. FIG. 6 begins in step 600. The inputs and the outputs of the spare channel transponder 510 are attached to the respective channel input and outputs at the near end TODF 430 for the channel being tested as follows. In step 602, the link 432, which is the output of the spare channel transponder 510, is manually patched to the channel input for testing. This manual patch is shown as the link 422 in FIGS. 4 and 5. In step 604, the channel output for testing is manually patched to the link 434, which is the input of the spare channel transponder 510. This manual patch is shown as the link 424.

At the far end TODF 490, a hard loop back link 492 is attached to complete the circuit in step 606. In step 608, the switch 528 is switched to the pattern generator 530 to connect the pattern generator 530 to the short reach transmitter 526. In another embodiment, other connectors are used instead of the switch to connect the pattern generator 530 to the short reach transmitter 526. In step 610, the pattern generator 530 generates a test signal with a pseudo random bit sequence. In one embodiment for testing an OC-48/STM-16 for example, the test signal is an STS-48C with a $2^{23}-1$ Pseudo Random Bit Sequence to simulate live traffic. In another embodiment for testing an OC-192/STM-64, the test signal is a STS-192c. In another embodiment, an OC-768C is tested. In one embodiment, the test signal comprises a test pattern. In step 612, the short reach transmitter 526 transmits the test signal with a pseudo random bit sequence to the circuit 495 via the link 432. In step 614, the display device 410 monitors optical power levels, loss of modulation, and B1 byte errors or code violations at ingress and egress points in the communication network 400. In this embodiment, the display device 410 monitors the performance of the circuit from the terminal 440, the terminal 450, the terminal 460, the OADM 470, and the terminal 480 via the network 420 as described above. Also, the display device 410 includes a graphical user interface to control the transmitting operations by generating and transmitting control instructions. In step 616, a final bit error rate test is performed by counting B1 byte error or code violations at the spare channel at link 434 in the spare channel transponder 510. FIG. 6 ends in step 618.

In another embodiment, the spare channel transponder 510 performs end-to-end testing without a manual patch for a loop back. Thus, another channel transponder at the end of the circuit opposite of the spare channel transponder 510 receives the test signal and monitors the test signal to determine performance of the circuit.

Figure 7:
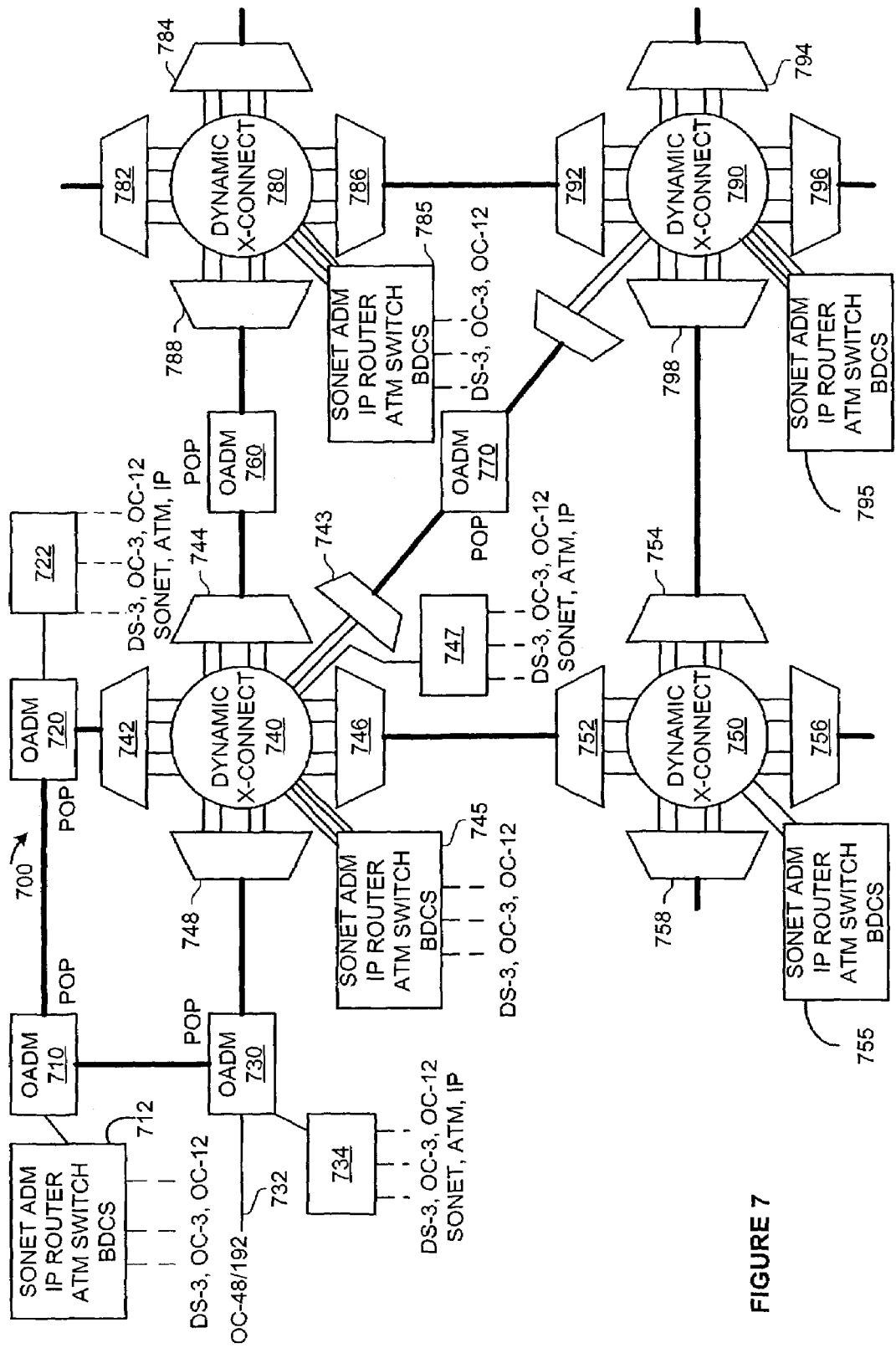
FIG. 7 is an illustration of a communication network with dynamic cross-connects in accordance with the present invention.

FIG. 7 depicts an illustration of a communication network 700 with dynamic cross-connects in an example of the invention. Instead of using a loop-back patch link as described above, the invention may be logically extended to photonic or dynamic cross-connect serving such as North, South, East, and West terminals and other network elements. In FIG. 7, the invention is applied to the communication network 700 instead of using manual patches as described above. Thus, BER testing, tune-up, and maintenance can be a wholly remote activity. The communication network 700 comprises dynamic cross-connects 740, 750, 780, 790, DWDM Mux/Demux 742, 743, 744, 746, 748, 752, 754, 756, 758, 782, 784, 786, 788, 792, 794, 796, 798, DWDM OADMs 710, 720, 730, 760, 770, and terminals 712, 722, 724, 745, 747, 755, 785, 795. The DWDM OADMs 710, 720, 730, 760, 770 are points of presence. In some embodiments, the terminals 712, 722, 724, 745, 747, 755, 785, 795 are also points of presence. The thin lines interconnecting the network elements are OC-48/192/768 or 10 GbE. The thick lines interconnecting the network elements are optic fibers carrying DWDM. In this embodiment, a user may telnet from a display device to a communication device within the communication network 700 to add the communication device to the circuit being tested.

Figure 8:
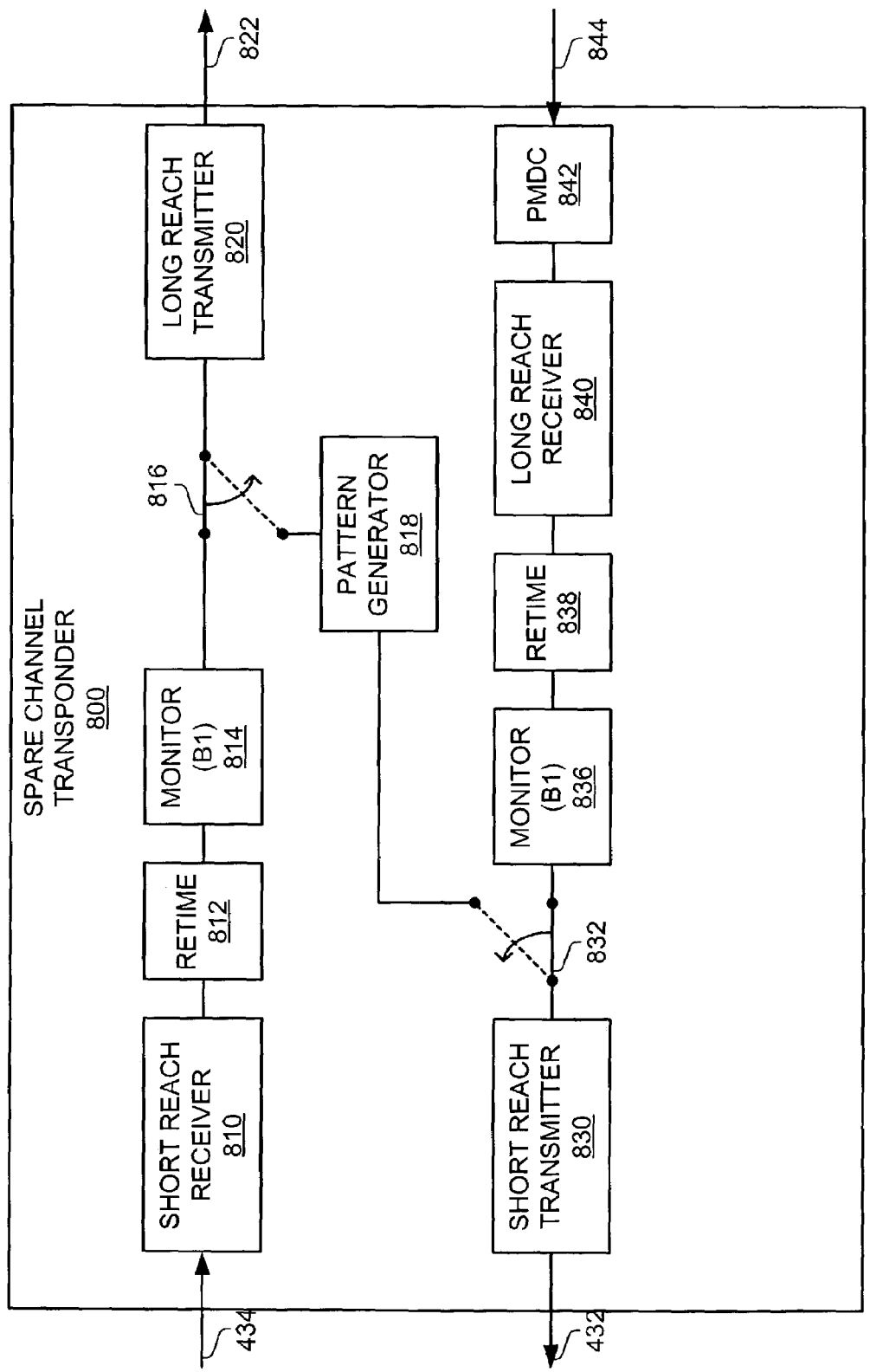
FIG. 8 is an illustration of a spare channel transponder with one pattern generator in an example of the invention.

In another embodiment of the invention, the spare channel transponder 510 only includes one pattern generator to generate test signals. FIG. 8 depicts an illustration of a spare channel transponder 800 with one pattern generator in an example of the invention. The spare channel transponder 800 is identical to the spare channel transponder 500 in FIG. 5 except for the following differences. The pattern generator 534 is eliminated from the spare channel transponder 800, and the switch 832 is connected to the pattern generator 818. Thus, the pattern generator 818 generates test signals for both the long reach transmitter 820 and the short reach transmitter 530.

The channel transponder advantageously eliminates a separate, external transmitter that tests for continuity and/or Bit Error Rate (BER). Thus, the expensive costs and space of the separate transmitter are eliminated, which makes testing the circuit in a communication network cheaper and more efficient. ASICs can generate the test drive signal cheaply. Additionally, less equipment translates into less maintenance time and costs. The possibility of electrical shocks from the transmitter as discussed above is eliminated as well.

The invention claimed is:

1. A communication network for testing a circuit having a production channel and a spare channel, the communication network comprising:
a production channel transponder comprising:
production short reach receiver circuitry configured to receive a first short reach signal on the production channel;
production long reach transmitter circuitry configured to transmit on the production channel a first long reach signal based on the first short reach signal;
production long reach receiver circuitry configured to receive on the production channel a second long reach signal;
production short reach transmitter circuitry configured to transmit on the production channel a second short reach signal based on the second long reach signal;
the communication network characterized by:
a spare channel transponder comprising:
generator circuitry configured to generate a test signal;
a connector configured to connect the generator circuitry to spare short reach transmitter circuitry; and
the spare short reach transmitter circuitry being further configured to transmit on the spare channel the first short reach signal based on the test signal from the generator circuitry over a first patch link to the production short reach receiver circuitry.

2. The communication network of claim 1 further characterized by:
the spare channel transponder comprising:

spare short reach receiver circuitry configured to receive on the spare channel the second short reach signal over a second patch link from the production short reach transmitter circuitry; and monitor circuitry configured to monitor the spare channel to determine the performance of the circuit.

3. The communication network of claim 1 wherein the test signal comprises a pseudo random bit sequence.

4. The communication network of claim 1 wherein the test signal comprises an alarm indication signal.

5. The communication network of claim 1 wherein the test signal comprises a test pattern.

6. The communication network of claim 1 wherein the test signal comprises an error.

7. The communication network of claim 1 wherein the generator circuitry is configured to receive control instructions from a remote control device and generate the test signal based on the control instructions.

8. The communication network of claim 1 wherein the connector comprises a switch.

9. A method of testing a circuit having a production channel and a spare channel in a communication network using Dense Wavelength Division Multiplexing, the method comprising:

in production short reach receiver circuitry, receiving a first short reach signal on the production channel;

in production long reach transmitter circuitry transmitting a first long reach signal based on the first short reach signal on the production channel;

in production long reach receiver circuitry receiving a second long reach signal on the production channel;

in production short reach transmitter circuitry transmitting on the production channel a second short reach signal based on the second long reach signal;

the method characterized by the steps of:

connecting generator circuitry in a channel transponder to the spare channel;

generating a test signal in the generator circuitry; and transmitting the test signal from the generator circuitry to spare short reach transmitter circuitry; and in the spare short reach transmitter circuitry transmitting on the spare channel the first short reach signal based on the test signal over a first patch link to the production short reach receiver circuitry.

10. The method of claim 9 further comprising:

in spare short reach receiver circuitry receiving on the spare channel the second short reach signal over a second patch link from the production short reach transmitter circuitry; and monitoring the spare channel to determine the performance of the circuit.

11. The method of claim 9 wherein the test signal comprises a pseudo random bit sequence.

12. The method of claim 9 wherein the test signal comprises an alarm indication signal.

13. The method of claim 9 wherein the test signal comprises a test pattern.

14. The method of claim 9 wherein the test signal comprises an error.

15. The method of claim 9 further comprising receiving control instructions from a remote control device and wherein generating the test signal and transmitting the test signal are in response to the control instructions from the remote control device.

16. The method of claim 9 further comprising injecting errors into the test signal from a remote control device.

\* \* \* \* \*